May 2, 1939.  M. SCHON ET AL  2,156,608
REFRACTORY AND METHOD OF MAKING SAME
Filed March 25, 1937  4 Sheets-Sheet 3

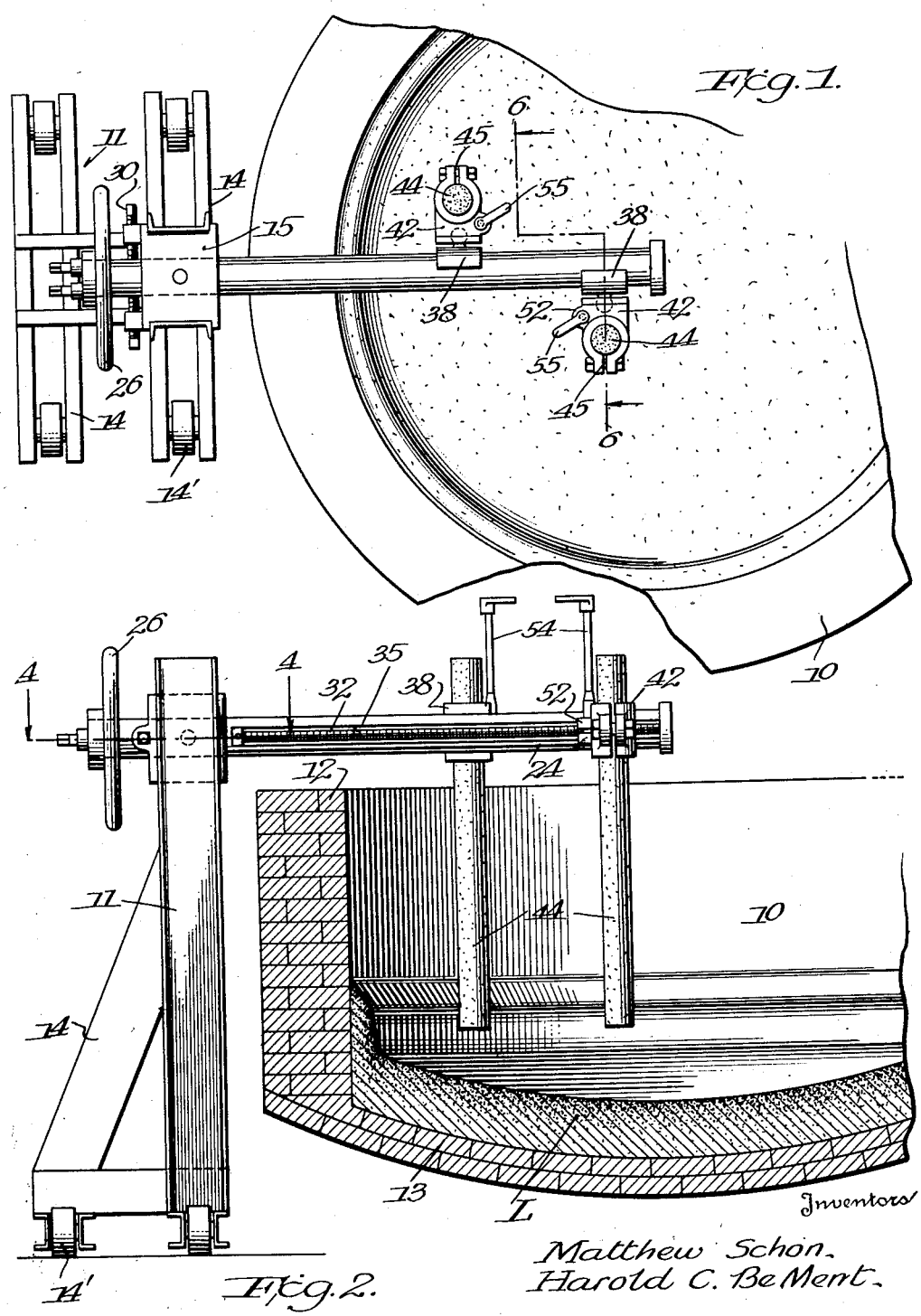

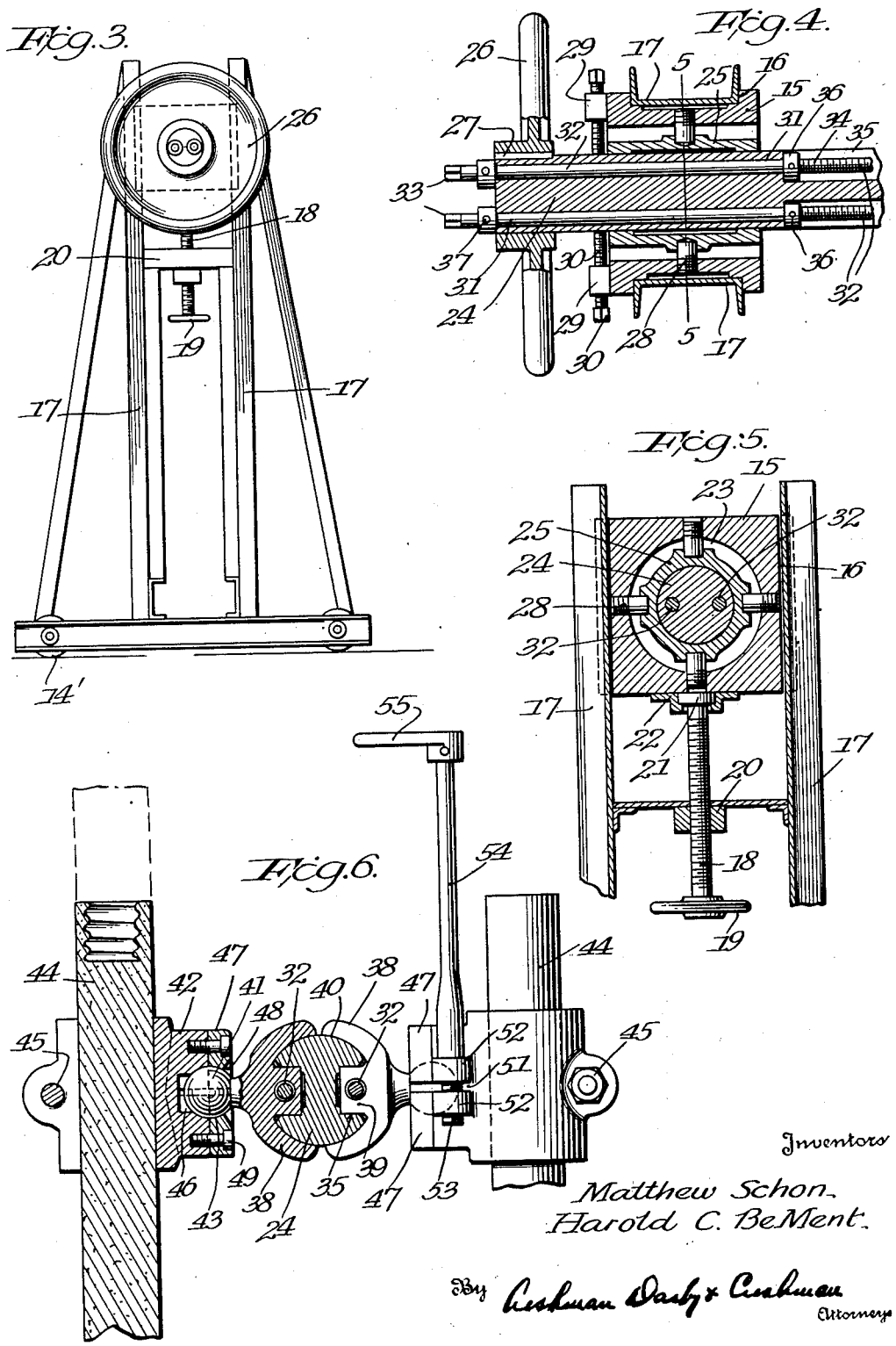

Inventors
Matthew Schon
Harold C. Bement

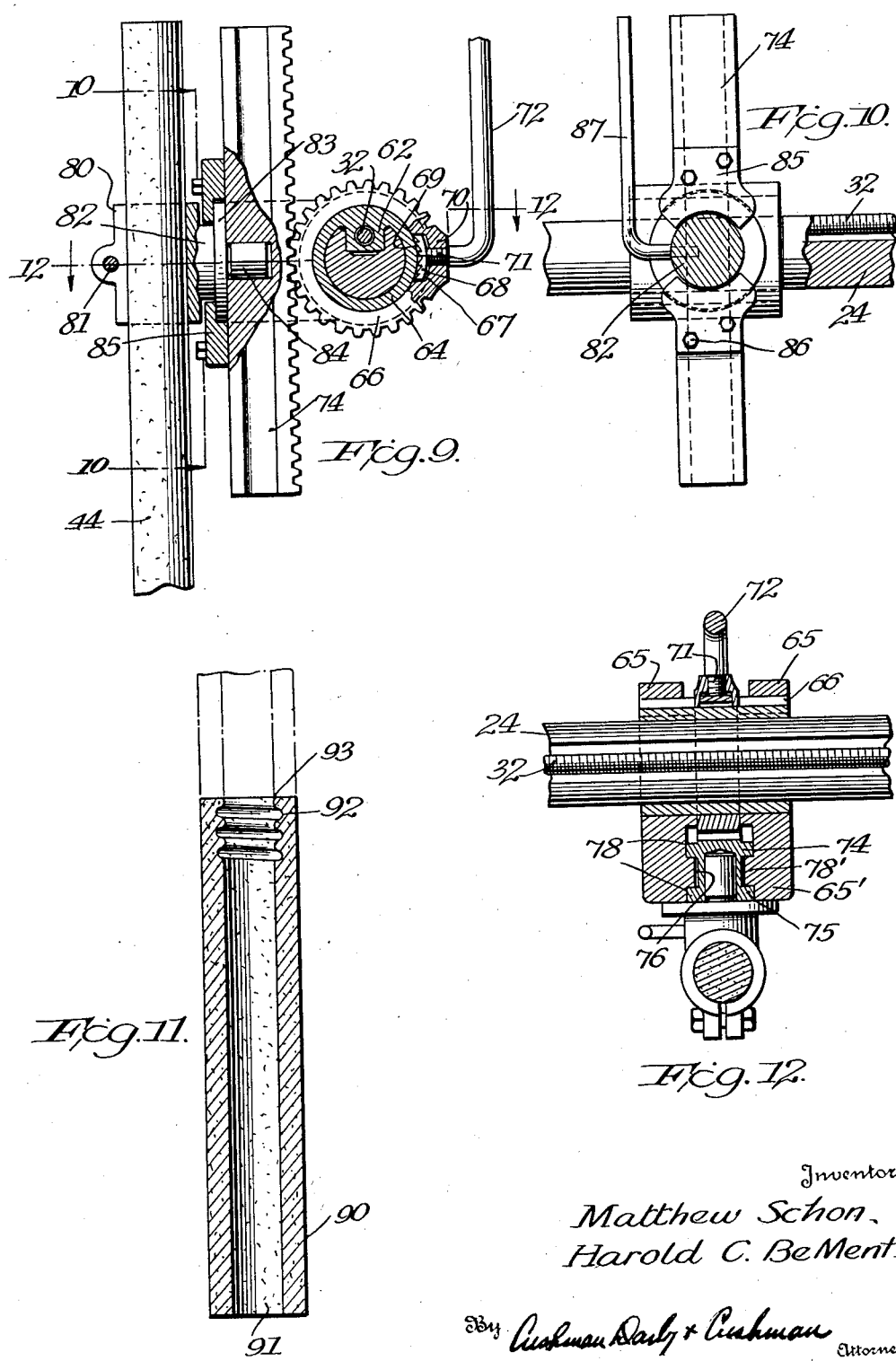

Patented May 2, 1939

2,156,608

UNITED STATES PATENT OFFICE 2,156,608

REFRACTORY AND METHOD OF MAKING SAME

Matthew Schon and Harold C. Be Ment, Baltimore, Md., assignors to Crown Cork & Seal Company, Inc., Baltimore, Md., a corporation of New York Application March 25, 1937, Serial No. 133,079

8 Claims. (Cl. 13—36)

This invention relates to refractory linings and to an improved method and apparatus for producing such linings. In general, the linings are employed for furnace bottoms, runners, ladles and, in fact, all types of receptacles used to melt, hold, or carry molten metals, such as iron, steel, nickel, copper, chromium or compounds of these metals.

At the present time and by way of illustration, in the case of a furnace bottom, the successive heats to which the metal or metal batches are subjected, the agitation which takes place in the melt, the high temperatures, and the presence of chemical compounds, frequently results in cutting-in and disintegration of the refractory bottom. Furnace bottoms are now commonly constructed of a brickwork of highly refractory material in which the bricks are either cemented together or laid loose and covered with a layer of powdered and granulated material which is fused upon the bricks. Such a refractory bottom is highly expensive and its disintegration not only reduces the working time of the furnace, but also, in many cases, causes an impure end product to be obtained, due to inclusions in the melt of refractory material.

It is an object of the present invention to eliminate or reduce as far as possible the cutting-in of the refractory bottom due to the rigorous conditions to which the bottom is subjected. To this end, the present invention provides for burning-in or fusing-in a refractory lining upon the bottom brickwork, which lining is built up of successive layers of refractory material. An important feature of the lining resides in the composition of the successive layers whereby the refractory characteristic is increased from the base toward the surface or top zone of the lining. Such a construction enables a highly refractory and resistant lining to be obtained at decreased cost and the lining has a considerably longer life than at present.

In building up the lining, spot fusing is resorted to as distinguished from fusing the entire lining simultaneously. This latter, we find, injuriously affects the relatively softer and cheaper brickwork of the sides and roof of the furnace due to the high temperatures created in the furnace, whereas by fusing-in localized areas, such destructive condition is avoided.

In order to accomplish the localized burning-in of built-up layers of refractory material, which layers have a successively increasing temperature of fusion to the surface zone of the lining, we provide an apparatus which is independent of the furnace or other structure to which the lining is being applied. This apparatus is mobile and enables successive spots or areas to be fused or burned-in. Moreover, this apparatus will enable the furnace to be repaired both as regards the bottom, the side walls or the roof. Generally stated, the apparatus includes as the heating or fusing means, a direct or indirect electric arc and the temperature of fusion may be controlled so that, at all times, it will be above the fusion point of the refractory mass in the localized area under treatment.

The composition of the lining well consists of refractories such as magnesium oxide, aluminum oxide (alumina), iron oxide, silica and zirconium, as well as neutral, acid, or basic material. The various materials mentioned, as well as other refractory substances, may be mixed or blended in suitable proportions to control the fusion point of any particular layer of the lining. For example, the magnesium oxide which has the highest fusing point, will be increased in amount in the respective layers from the base of the lining to the top zone thereof in such a manner that the top zone will consist substantially entirely of this refractory material.

It will be understood, that the lining itself, the process of producing it and the apparatus employed are subject to change and modification without departing from the spirit of the present invention. In the following specification we have described preferred forms of the invention by way of illustration, but the invention is not to be construed as limited thereto.

Referring to the drawings:

Figure 1 is a top elevation showing one form of the apparatus in position for forming a lining in a furnace;

Figure 2 is a view partly in elevation and partly in section;

Figure 3 is an end elevation of the mobile apparatus for burning in the lining;

Figure 4 is a sectional view on the line 4—4 of Figure 2;

Figure 5 is a sectional view on the line 5—5 of Figure 4;

Figure 6 is a sectional view on the line 6—6 of Figure 1;

Figure 9 is a sectional view on the line 9—9 of Figure 7;

Figure 10 is a sectional view on the line 10—10 of Figure 9;

Figure 11 is a detailed sectional view of an electrode employed in connection with the apparatus of Figures 1 and 7; and Figure 12 is a section on the line 12—12 of Figure 9.

Figures 7, 8:
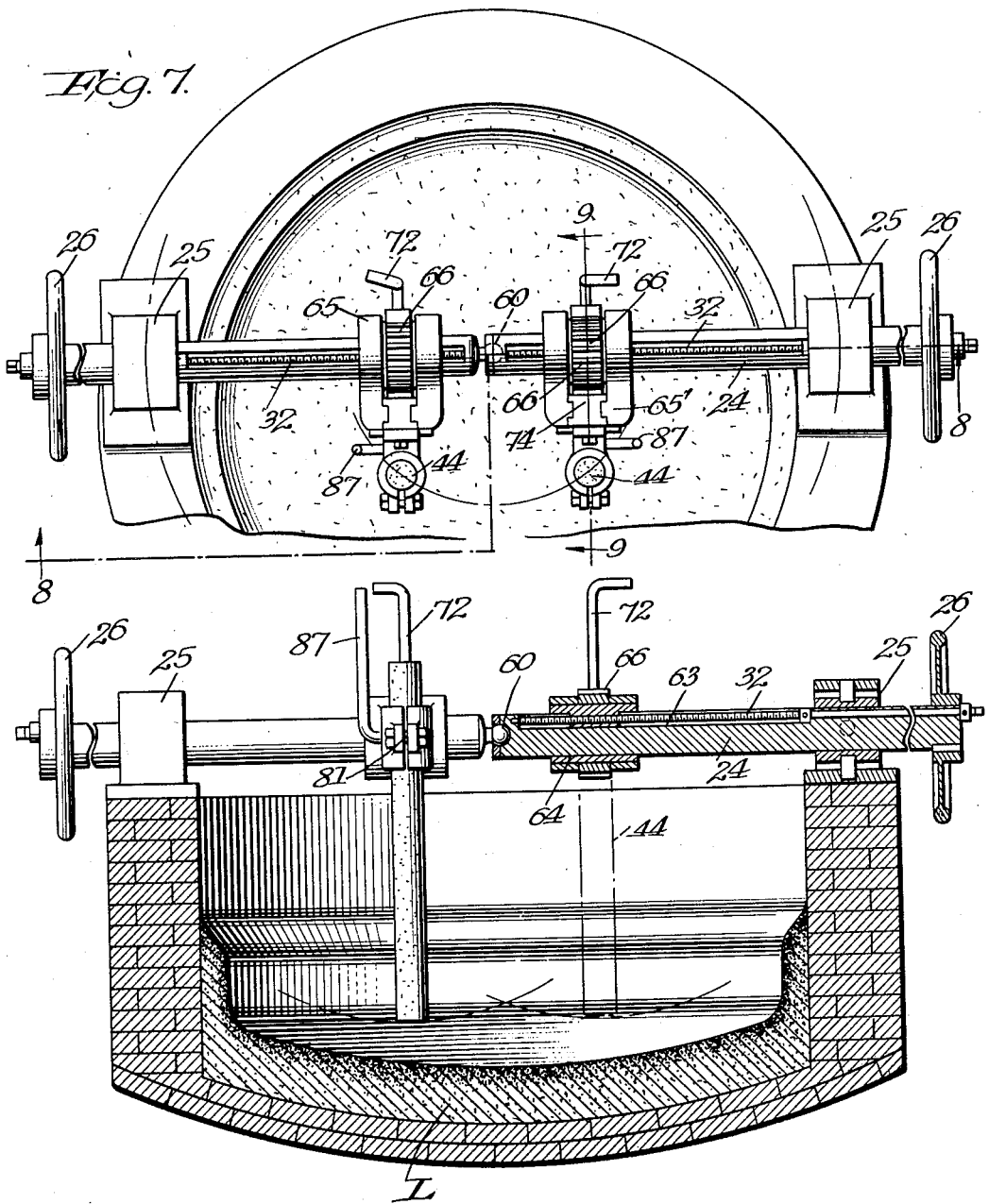
Figure 7 is a top elevation showing a modified form of apparatus applied to a furnace.
Figure 8 is a sectional view on the line 8—8 of Figure 7.

We will describe the invention in connection with a furnace bottom simply for purposes of illustration and it is to be understood, that the invention is equally applicable in connection with ladles, runners and, in fact, with any construction for holding or carrying metals having a high temperature, the lining being shown at L.

Apparatus

In Figures 1 and 2, we have illustrated the furnace at 10 and the mobile apparatus for fusing or burning in the lining at 11.

The brickwork 12 of the furnace forming the side wall thereof is relatively inexpensive and of lower refractory value than the more expensive brickwork 13 which forms the bottom of the furnace. As stated above, it is an important feature of this invention that temperature conditions within the furnace are so controlled that the relatively softer bricks 12 are not disintegrated or affected by the fusing or burning-in at high temperatures of the refractory lining upon the bottom. This result is attained by a localized fusing or burning-in of the lining and proceeding from area to area as distinguished from previous methods where the entire mass was of necessity heated and such a high temperature created in the furnace that it was impossible to control disastrous effects upon the bricks of the side wall and top.

In order to carry out the invention both with respect to localizing the burning-in or fusing-in of the lining and avoiding the presence of such high temperatures as will affect the side and top wall brickwork, we use the mobile apparatus illustrated in Figures 1 to 6, and a modified form thereof as illustrated in Figures 7 to 12. This apparatus, broadly stated, includes the use of a direct or indirect electric arc, preferably single phase.

Referring to Figures 2 and 3, we have shown a frame 14 of rigid construction preferably of metal channel iron and mounted upon rollers 14'. Vertically adjustable on the frame 14 is a block 15 which, as shown in Figures 4 and 5, is recessed at 16, so as to receive and have vertical sliding movement upon the channel irons 17 of the frame 14. For elevating and lowering the block 15 relative to the beams 17, there is provided a threaded rod 18 having a handle 19, which rod has threaded engagement in a suitably fixed guide 20 and has an enlarged end 21 freely engaging the block 15 on its bottom, as shown in Figure 5. The enlarged end 21 of the stem 18 is confined within a housing 22 suitably fixed to the base of the block. In the block 15 is an opening 23 within which is supported a horizontally extending shaft 24 having a bushing or sleeve 25. The shaft 24 is rotatable relative to the sleeve 25 by means of the handle 26 which is keyed at 27 to the shaft. The sleeve and shaft are supported in position within the block and spaced from the wall of the opening 23 therein by means of the threaded members 28 of which we have illustrated four, but there may be as many as desired. The block is provided with a pair of threaded bosses 29 receiving threaded studs 30 which may be tightened to engage the shaft 24 and hold it in any of its rotated positions relative to the sleeve 25. It will be noted at this point, that the frame 14 is bodily movable, and that the shaft 24 is both vertically movable, and rotatable about a horizontal axis.

The shaft 24 is provided with openings 31 receiving a pair of rods 32, the free ends of which are formed as at 33 to receive a suitable turning tool. At their opposite ends, the rods are threaded as shown at 34 and are disposed in opposed slots 35 in the shaft. Suitable stop collars 36 are fixed to the rods 32 at the free end of the shaft and within the slots 35 by means of studs 37, and serve to prevent longitudinal movement of the rods, as shown in Figure 4. The threaded portions 34 of the rods 32 respectively engage supporting members 38 which, as shown in Figure 6, have integral longitudinally extending projections 39, through which the rods are threaded. The supporting members 38 are arcuate in cross-section so as to snugly but slidably engage the shaft 24 as shown at 40. The projections 39 are slidably received within the slots 35 of the shaft as shown in Figure 6 and by reason of their threaded engagement with the threaded ends 34 of the rods 32, rotation of the rods will serve to longitudinally position the arcuate holding members on the shaft and with relation to each other so that the electrodes can be positioned to heat or fuse any localized area.

The electrode supporting members 38 are each provided with an integral ball 41 engaging in a ball socket 43 of an electrode bracket 42, as shown in Figure 6. This ball and socket connection permits universal movement of each electrode 44 carried by a bracket 42 in which the electrode is vertically adjustable. The bracket 42 has its free ends clamped together by the bolt and nut construction 45 and at its opposite end, the socket 43 of universal joint structure is covered by plates 47 defining an opening 48 and secured to the bracket 42 by studs 49. The bracket is split on one side as shown at 51 and provided with a pair of ears 52 in which is threaded the end 53 of a rod 54 having a handle 55 and, as shown in Figures 1 and 2, the rod extends well above the shaft 24 so that it can be manually operated. Turning the handle 55, releases the ball 41 in its socket, so that the electrode may be turned by the handle to any desired position whereupon the handle is again turned to tighten the ball in its adjusted position.

It is to be noted that each electrode is mounted independently for universal movement and for longitudinal movement, and that, in addition, the shaft is mounted for rotation so that the electrodes may be adjusted to position in a vertical plane at right angles to the axis of the shaft and may likewise be adjustably elevated. Moreover, the electrodes may be so adjusted independently relative to one another, that the distance between them may comprehend any desired localized area of the lining which it is desired to fuse or burn-in, whether it be the bottom, side or corner of the furnace.

In Figures 7 and 8, we have illustrated a modification, wherein the frame member 14 is omitted and the apparatus is positioned, i. e., rests upon the top of the wall 12. In this construction, each shaft 24 is similarly mounted in a block 15, as shown in Figure 4, which blocks are movable upon the wall of the furnace or other structure. Two blocks are employed and, manually, are so positioned that their shafts may have any required angular relation to each other. Thus, the shafts 24 are connected by a ball and socket joint 60 as shown in Figures 7 and 8. Each shaft is rotatably mounted in the sleeve 25 and is rotated by means of a hand wheel 26. A single rod 32 extends through each shaft 24, as shown in Figure 8, and we will describe the construction of one shaft and the means for supporting the electrode, since they are similar in each case.

Referring to Figures 8 and 9, the threaded end of the rod 32 engages a projection 62 disposed in a slot 63 in the shaft 24. This projection 62 is integral with a sleeve 64 and by rotating the threaded rod 32, the sleeve with which is associated the electrode carrying means is adjusted longitudinally on the shaft 24. In this manner, the electrodes are adjusted relative to the area of the lining which is to be fused and are also brought into proper spaced relation with each other. Referring to Figure 12, surrounding the sleeve 64 are a plurality of rings 65 which are keyed to the sleeve as at 66. Between the rings and about the sleeve 64 is positioned a gear 66 which is freely rotatable on the sleeve. The gear is provided with an internal recess 67 in which is positioned a shoe 68 having a serrated surface 69, as shown in Figure 9, and adapted to engage the smooth adjacent surface of the sleeve 64. The gear is provided with an opening 70 in which is threaded the end 71 of a lever 72. By turning on the said lever, the shoe is pressed against the sleeve by the end 71 of the lever or the sleeve is released therefrom for a purpose which will now be described. Carried in ears 65' of the ring members 65 is a rack 74, which, as shown in Figure 12, is slidably mounted between the ears, the said rack having spaced projections 75 defining an internal recess 76, and the ring members having their ears 65' formed with recesses 78 receiving the projections 75 and provided with projections 78 disposed in the recesses 76, as shown in Figure 12. The teeth of the gear 66 and the teeth of the rack 74 are always in engagement. The electrode 44 is adjustably carried in a bracket 80, the free ends of which are clamped together by a bolt and nut as shown at 81, whereby the electrode may be vertically adjusted, and this bracket has a cylindrical portion 82, an integral flange 83 and extending therefrom a stud 84. The stud 84 as shown in Figures 9 and 12 is received in a recess in the rack 74 and the flange 83 is secured to the rack by means of the plate members 85 which are bolted, as shown at 86 in Figure 10, to the rack.

In order to elevate the electrode, the operator turns the handle 72 to disengage the end of the screw-threaded portion 68 from the shoe 67 and by then moving the handle in a plane of rotation at right angles to that of the first turning movement, the gear is rotated about the sleeve, and the rack engaged therewith and the electrodes carried by the rack are lowered as desired. When the electrode has been properly elevated, the screw threaded end 68 is again rotated by the handle 72 to force the shoe into engagement with the sleeve and hold the rack in its adjusted position.

A lever 87, as shown in Figure 10, has one end fixed in the shaft 82 of the bracket, whereby the bracket may be rotated upon the flange 83 within the plate members 85 and stud 84 so as to adjust the angular position of the electrodes in a vertical plane at right angles to the plane of rotation of the shaft 24, as shown by the arcuate lines in Figure 8.

It will be observed that with each of the mobile apparatus described, the electrodes are each independently adjustable (1) longitudinally, (2) vertically, and (3) in vertical planes at right angles, and in the construction of Figures 7 to 12, the shafts are adjustable to each other by means of their ball and socket connection. Thus, limited spots or localized areas of the furnace may be treated progressively and a complete lining burned-in or repairs made with equal facility.

Referring to Figure 11, we have shown at 90 an electrode having an opening 91 therethrough. With such a structure, the refractory material may be fed to the furnace bottom through the opening and simultaneously or subsequently fused. At one end the electrode is threaded as at 92, so that as it wears, another electrode having an externally threaded end 93 may be connected to the first electrode and the apparatus continued in operation.

The electrodes are electrically energized in any suitable manner and are preferably of the carbon type.

The method

In preparing a lining in accordance with this invention, we first prepare a refractory mixture and apply it as a layer of suitable thickness upon the furnace bottom. This initial layer of refractory mixture has a relatively low fusing temperature. The apparatus is now operated to successively fuse localized areas of the layer to a homogeneous mass by means of the electric arc. Upon this layer is built up succeeding layers, each having an increased fusing temperature and each fused at successive localized areas or spots until a homogeneous lining having the desired thickness is obtained in which the layer or zone contacting the molten metal has the highest refractory quality. This is advantageous in saving lining material, since the material having the higher fusing point is the more expensive and, also, the resistance of the lining is rendered greatest at the point of greatest wear. Moreover, this method of building up and progressively fusing localized areas of each layer to form a lining is advantageous in that temperatures which might disintegrate the brickwork of the sides and top of the furnace are not created in the furnace.

By "homogeneous" lining, we mean a lining having an integral structure formed by fusing the respective superposed layers to each other, it being understood that each successive layer is fused at an increased temperature.

The product

In building up the lining, we first apply a refractory mixture of the compounds heretofore mentioned. This mixture preferably initially has a relatively low fusion temperature. For example, in a mixture of magnesia oxide whose melting point is between 3500° F. and 3600° F., aluminum oxide whose fusing temperature is between 3300° F. and 3400° F. and iron oxide whose fusing temperature is between 2500° F. and 2700° F., by the use in the first layer of a large percentage of iron oxide, the melting temperature can be lowered below 3000° F. The layer is applied directly upon the brickwork of the bottom and heat applied by means of the arc created through the electrodes until the fusing temperature of the mixture has been exceeded and the mixture has properly fused. Relatively thin layers are then continually added, the fusion point of the mixture in each case being appropriately increased, i. e., in each following layer the percentage of iron oxide and aluminum oxide are decreased and the magnesium oxide increased and the fusion temperature created through the arc increased until the material fuses in each case. After repeated layers of these materials are superposed, each layer holding a higher percentage of magnesium oxide, a condition is reached when the material at the top zone of the lining is substantially pure magnesium oxide which has the highest fusing temperature and refractory characteristic. The lining is homogeneous, since, upon each application of a layer of the refractory material and heating to fuse the same, the newly added layer fuses with the one immediately below and a solid bottom or lining of any desired thickness is obtained. Thus, the lining is graduated from the bottom or first layer which may have as high as 40% iron oxide to the top layer or zone which comes in contact with the molten metal and which may have as high as 98% magnesium oxide and a fusing temperature of about 3400° F. or above. The lining is free from porosity and is capable of withstanding repeated melts, heats, boils or long holding periods of liquid metals at elevated temperatures and notwithstanding that considerable agitation and chemical action take place. We find that there is no cutting-in of the bottom of the furnace, runner, ladle or other receptacle and that the metal does not contain any deleterious inclusions.

It is to be understood that while other heating means may be employed, we prefer to use an electric arc, since vapors given off by the materials of the lining when heated to elevated temperatures assist in carrying the current necessary to fuse the materials to a molten mass, and, moreover, the conductivity of the mass of the lining increases with heating and the material rises in temperature due to the heating within its own mass.

In Figures 2 and 8 of the drawings, we have illustrated the furnace 10 formed with a lining L of refractory material made in accordance with the present invention. The composition of this lining may vary as desired and the constituents of the mixture for each layer may likewise be varied and controlled. The present invention permits a controlled temperature to be exerted to take care of the fusing point of any desired mixture and the apparatus permits the lining to be formed as a homogeneous continuous built-up body from progressively fused localized areas of the respective layers, each of the localized areas being of substantially less area than the total area of the lining.

Also, it will be appreciated that the apparatus affords a universal means of applying a lining to the bottom, side walls, and corners of the particular structure and may be used where the structure has a variety of shapes and sizes.

We claim:

1. A refractory lining comprising superposed layers of fused and hardened refractory material fused together and each layer increasing in fusing point from the base of the lining to the surface thereof.

2. A refractory lining comprising superposed layers of fused and hardened refractory mixture, said layers fused together, said lining having an amount of highly refractory constituent increasing progressively from the base layer to the surface zone.

3. The method of making a refractory lining comprising forming a layer of refractory material of relatively low fusion point, fusing the layer, applying thereto a layer of refractory material of higher fusion point, and fusing the second layer to said first layer.

4. The method of making a refractory lining comprising forming a layer of refractory material of relatively low fusion point, fusing the layer, applying thereto a layer of refractory material of higher fusion point, and fusing the second layer to said first layer, and applying successive layers in the same manner each of progressively increased fusion point until the surface layer has a final melting point above the temperature to which the lining will be subjected.

5. The method of making a refractory lining comprising progressively fusing at localized areas each substantially less than the total area of the lining a layer of refractory material of relatively low fusion point until the entire area of the lining has been fused, applying a layer of refractory material of higher fusion point, and progressively fusing the second layer at localized areas to said first layer throughout the area of the layers.

6. The method of making a refractory lining comprising progressively fusing at localized areas each substantially less than the total area of the lining a layer of refractory material of relatively low fusion point, applying thereto a layer of refractory material of higher fusion point, and progressively fusing the second layer at localized areas to said first layer throughout the area of the layers, and applying successive layers, each of progressively increased fusion point and fusing each layer to the one beneath in the same manner until a built-up homogeneous lining is produced having the surface layer of a final melting point above the temperature to which the lining will be subjected.

7. The method of making a refractory lining comprising progressively fusing at localized areas each substantially less than the total area of the lining a layer of refractory material of relatively low fusion point until the entire area of the lining has been fused, applying a layer of refractory material of higher fusion point, and progressively fusing the second layer at localized areas to said first layer throughout the area of the layers, and conducting the fusing of the refractory material by means of an electric arc.

8. The method of making a refractory lining comprising progressively fusing at localized areas each substantially less than the total area of the lining a layer of refractory material of relatively low fusion point, applying thereto a layer of refractory material of higher fusion point, and progressively fusing the second layer at localized areas to said first layer throughout the area of the layers, and applying successive layers, each of progressively increased fusion point and fusing each layer to the one beneath in the same manner until a built-up homogeneous lining is produced having the surface layer of a final melting point above the temperature to which the lining will be subjected, and conducting the fusing of the refractory material by means of an electric arc.

MATTHEW SCHON.
HAROLD C. BE MENT.